(12) United States Patent
Comstock et al.

(10) Patent No.: US 8,116,771 B2
(45) Date of Patent: Feb. 14, 2012

(54) METHOD AND APPARATUS FOR EFFICIENT PAGING GROUP UPDATES IN A WIRELESS COMMUNICATION SYSTEM INCLUDING MOBILE RELAY STATIONS

(75) Inventors: David Comstock, San Diego, CA (US);
Phillip Barber, McKinney, TX (US);
Yunsong Yang, San Diego, CA (US);
Jianmin Lu, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 612 days.

(21) Appl. No.: 12/272,264

(22) Filed: Nov. 17, 2008

(65) Prior Publication Data
US 2009/0131084 A1 May 21, 2009

Related U.S. Application Data

(60) Provisional application No. 60/989,403, filed on Nov. 20, 2007.

(51) Int. Cl.
*H04Q 7/20* (2006.01)

(52) U.S. Cl. ......................... 455/436; 370/329

(58) Field of Classification Search ............ 455/436, 455/11.1, 435.1, 435.2; 370/329, 331
See application file for complete search history.

(56) References Cited

U.S. PATENT DOCUMENTS

| | | | |
|---|---|---|---|
| 2006/0025134 A1* | 2/2006 | Cho et al. | 455/435.1 |
| 2007/0249347 A1* | 10/2007 | Saifullah et al. | 455/436 |
| 2008/0003943 A1* | 1/2008 | Maheshwari et al. | 455/11.1 |
| 2008/0084842 A1* | 4/2008 | Xiang et al. | 370/329 |

OTHER PUBLICATIONS

IEEE Standards Activities Department, "Part 16: Air Interface for Fixed and Mobile Broadband Wireless Access Systems—Multihop Relay Specification," Jul. 23, 2008, pp. 1-314, Relay Task Group of IEEE 802.16.

* cited by examiner

*Primary Examiner* — Dwayne Bost
*Assistant Examiner* — Myron Wyche
(74) *Attorney, Agent, or Firm* — Slater & Matsil, L.L.P.

(57) ABSTRACT

A wireless communications network includes a base station and a number of mobile relay stations. Each mobile relay station within an area of coverage for the base station has associated with it a unique paging group identification value as well as the paging group identification value of the base station.

15 Claims, 13 Drawing Sheets

METHOD AND APPARATUS FOR EFFICIENT PAGING GROUP UPDATES IN A WIRELESS COMMUNICATION SYSTEM INCLUDING MOBILE RELAY STATIONS

This application claims the benefit of U.S. Provisional Application Ser. No. 60/989,403, filed Nov. 20, 2007 and incorporated herein by reference.

TECHNICAL FIELD

The present invention generally relates to communication systems and, in particular embodiments, relates to method and apparatus for efficient paging group updates in a wireless communication system including mobile relay stations.

BACKGROUND

In wireless communication systems, such as WiMAX, a Mobile Station (MS) may enter an Idle Mode when it is not actively exchanging user data with the Base Station (BS). In Idle Mode, the MS may conserve battery power by turning off its transmitter and turning on its receiver only during predetermined times, when the BS may notify the MS of pending traffic using a Paging procedure. While an MS is in Idle Mode, one BS will serve as its Selected BS. The MS synchronizes to the Selected BS, acquires its operational and configuration parameters, and monitors its transmissions for Paging notifications during predetermined times. As a MS moves through a network, it may choose a new Selected BS based on its signal strength relative to other BSs. Selecting a new Selected BS does not require the MS to exchange messages with the network.

As the MS moves, it may use a Location Update procedure to inform the network of its location so that paging notifications can be delivered to its Selected BS. When the MS performs the Location Update procedure, it exchanges messages with the network so, considering battery power consumption, it is beneficial if the MS does not update its location every time it selects a new BS. Rather, BSs may be grouped according to their proximity to each other and the MS updates its location only when it selects a BS in a different group than the current Selected BS. This means that the MS's location is not tracked with a granularity of a single BS so multiple BSs (i.e., BSs in the same group) must transmit Paging notifications for the same MS.

In WiMAX, this capability is provided by grouping BSs into Paging Groups, which are identified with a Paging Group Identifier (PGID). Each BS includes the PGIDs that it supports in its broadcast configuration information and when an MS performs the Location Update procedure, it is assigned a Paging Group that the newly selected BS supports. Each BS that supports this Paging Group will transmit Paging Notifications for this MS so the MS only updates its location when it selects a BS that is not a member of its assigned Paging Group.

When BSs are mobile, additional considerations should be made to make the Paging/Location Update processes efficient. To illustrate, when a mobile BS is near an MS for a short period of time, the MS may select it and perform Location Update if the mobile BS does not support the MS's current Paging Group. When the mobile BS then moves away from the MS, the MS may need to select another BS and perform another Location Update. In an area with many mobile BSs, the MS may perform multiple Location Updates in a short period of time, which wastes battery power and radio resources.

An example of a mobile BS is a Mobile Relay Station (MRS). Relay Stations (RSs) are of considerable interest in the wireless industry due, for instance, to the anticipated deployment of wireless networks capable of supporting higher data rates and, consequently, applications requiring higher bandwidth, such as media-rich applications. When the new networks are deployed using legacy cells plans, the higher data rates required for the higher-bandwidth applications can not be supported at the edge of the cell, which effectively reduces the size of the cell. RSs may be deployed in an area of good BS coverage and serve MSs in areas of weak BS coverage by relaying data between the BS and the MSs.

RSs may also be deployed to mitigate coverage holes, such as Mobile RSs (MRSs) on trains, for example. In this type of case, additional considerations may be made regarding selection of the MRS and Location Updates when an MRS is near an MS, such as whether MS does or does not join the MRS. As an example, an MS has joined an MRS when its movement is correlated to the MRS movement, such as when a MS user boards a train with an MRS.

Using the current methods in IEEE 802.16 Multi-hop Relay task group (802.16j), it is possible to avoid multiple Location Updates when an MRS is near an MS, the MS selects the MRS, and then the MRS moves (away from the MS). To do this, the MRS supports its own unique Paging Group as well as the Paging Group of its parent BS, for example, a BS at a train station. If an MS's Selected BS is the MRS's parent BS, then when the MRS moves near the MS, the MS may select it due to its signal strength. The MS will not perform Location Update, however, because the MRS supports the MS's Paging Group (Paging Group of MRS's parent BS). When the MRS moves and the MS has not joined the MRS, the MS will select the BS again, but will not perform Location Update since it is still assigned the Paging Group of this BS. If the MS joins the MRS, it would continue to have the same Paging Group assignment (associated with the parent BS).

When the MRS hands over to a new BS, it will then support the (new) Paging Group for this new BS. It may also discontinue supporting the Paging Group of its previous BS, which will cause the MS to perform Location Update. At this time the MS should be assigned the Paging Group of the MRS so that it does not need to update its location when the MRS hands over to a new BS. When the MRS changes its supported Paging Groups, its broadcast configuration information changes and MSs being served by the MRS are required to update their stored configuration for the MRS, which interrupts their idle/sleep cycle and impacts battery power consumption.

SUMMARY OF THE INVENTION

In various aspects, the present invention relates to the use of Paging Group Identifiers (PGIDs) when Mobile Relay Stations (MRS) are present in a wireless network. In specific embodiments, the present invention relates to a novel method of facilitating the avoidance of multiple Location Updates by Mobile Stations (MSs) within a short period of time, caused by the momentary presence of an MRS.

In one aspect, embodiments of the present invention provide for a method and apparatus to reduce the impact of frequent changes in MRSs' and BSs' configuration information when they support each others' PGIDs in order to reduce the frequency of MS Location Updates when MRSs hand over into and out of a BS's coverage area. This embodiment makes use of Primary, Secondary, and Ternary Paging Group Identifiers (PGIDs) as well as fields in the broadcast configuration information for MRSs and BSs that indicate when Secondary and Ternary PGIDs have changed.

In another aspect, embodiments of the present invention provide for a method and apparatus to reduce the number of Location Updates performed by MSs by deterring them from selecting an MRS unless they have joined the MRS.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments described below are not necessarily limitations to the present invention, but are used to describe an exemplary implementation of the invention.

Embodiments of the present invention provide unique methods and apparatuses to improve the efficiency of the procedures for updating the location of MSs in a wireless communication system that includes MRSs. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted; as such control circuits are within the skills of persons of ordinary skill in the relevant art.

Figure 1:
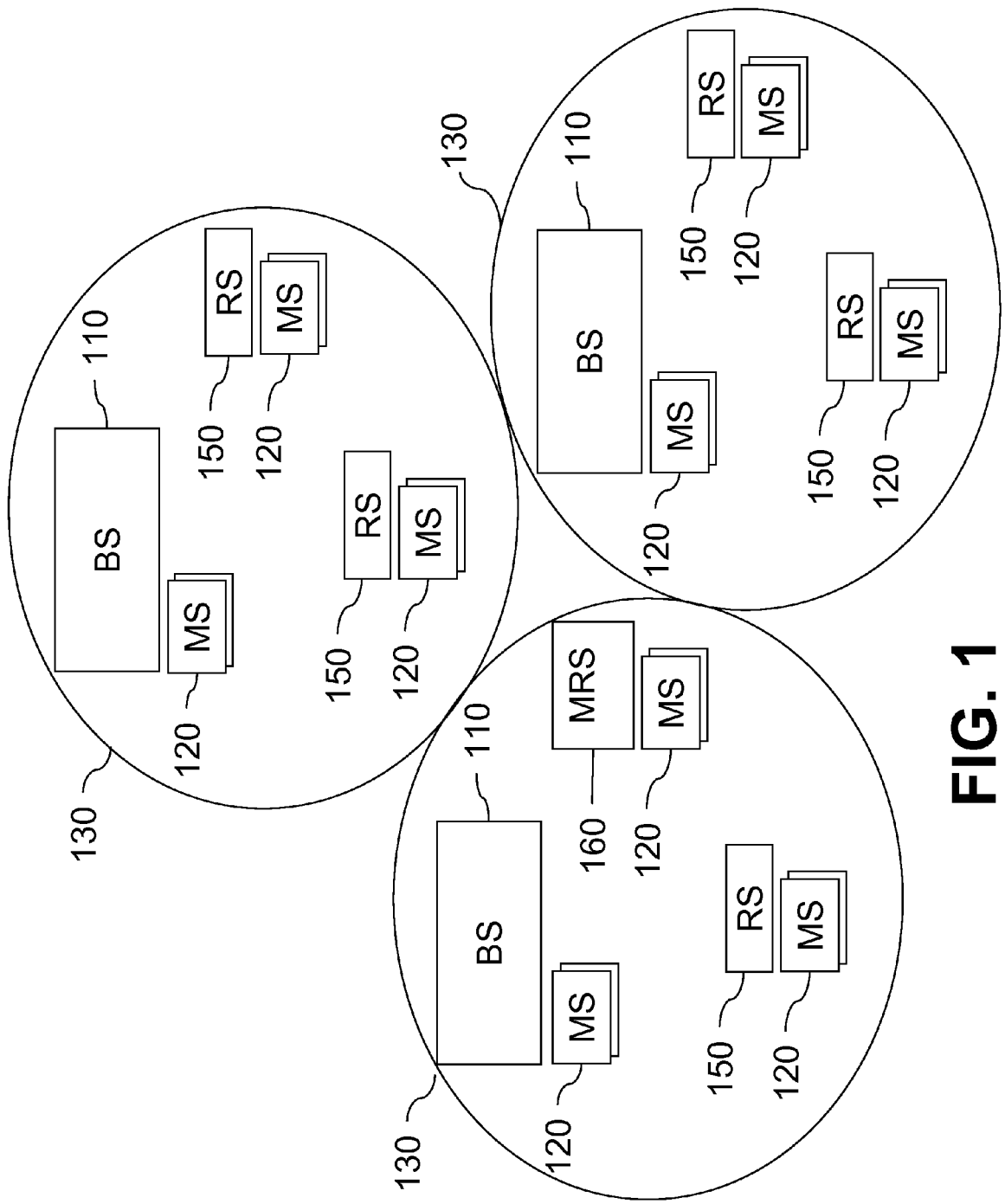
FIG. 1 illustrates a wireless communications network comprising a plurality of base stations (BS) and relay stations (RS) providing voice and/or data wireless communication service to a plurality of mobile stations (MS)

FIG. 1 is a wireless communications network comprising a plurality of base stations (BS) 110 providing voice and/or data wireless communication service to a plurality of mobile stations (MS) 120 and relay stations (RS) 150 providing voice and/or data wireless communication service to a plurality of mobile stations (MS) 120. Each BS 110 has a corresponding coverage area 130. In the illustrated embodiment, the coverage areas 130 are shown contiguous, but no overlapping. One skilled in the art will recognize that the present invention is applicable to such contiguous non-overlapping coverage areas, as well as to non-contiguous and/or overlapping coverage areas. The RSs 120 receive data from BSs 110, which data is forwarded (relayed) to MSs 120. The network can include one or more Mobile RSs (MRS) 160 which move through the network and include protocols and methods for maintaining communication with the network and with its served MSs 120.

Figure 2:
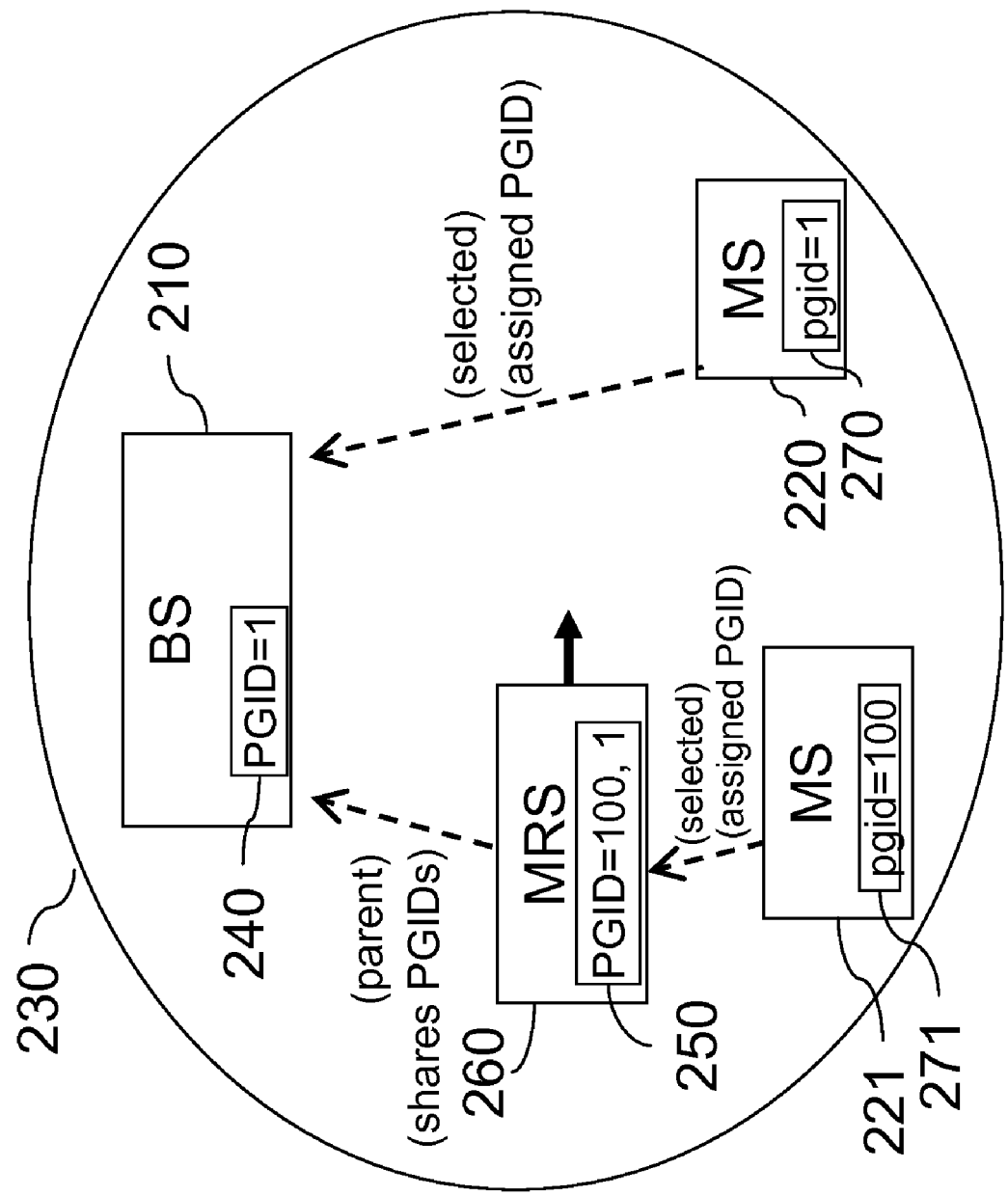
FIGS. 2-4 illustrate a base station and its corresponding coverage area and includes an MRS and multiple MSs and shows the relationships between the MSs, the BS, and the MRS and the corresponding use of PGIDs.

FIG. 2 includes BS 210, whose broadcasted PGID Record 240 includes PGID=1, and whose serving coverage area 230 includes an MRS 260 and an MS 220. MRS 260 supports BS 210's PGIDs and therefore includes them in its broadcasted PGID record 250. MS 220 is in Idle Mode and has selected BS 210 and has been assigned one of its PGIDs, which MS 220 stores in its PGID Register 270. MS 221 has selected MRS 260 and has been assigned one of its PGIDs, which MS 221 store in its PGID Register 271.

Figure 3:
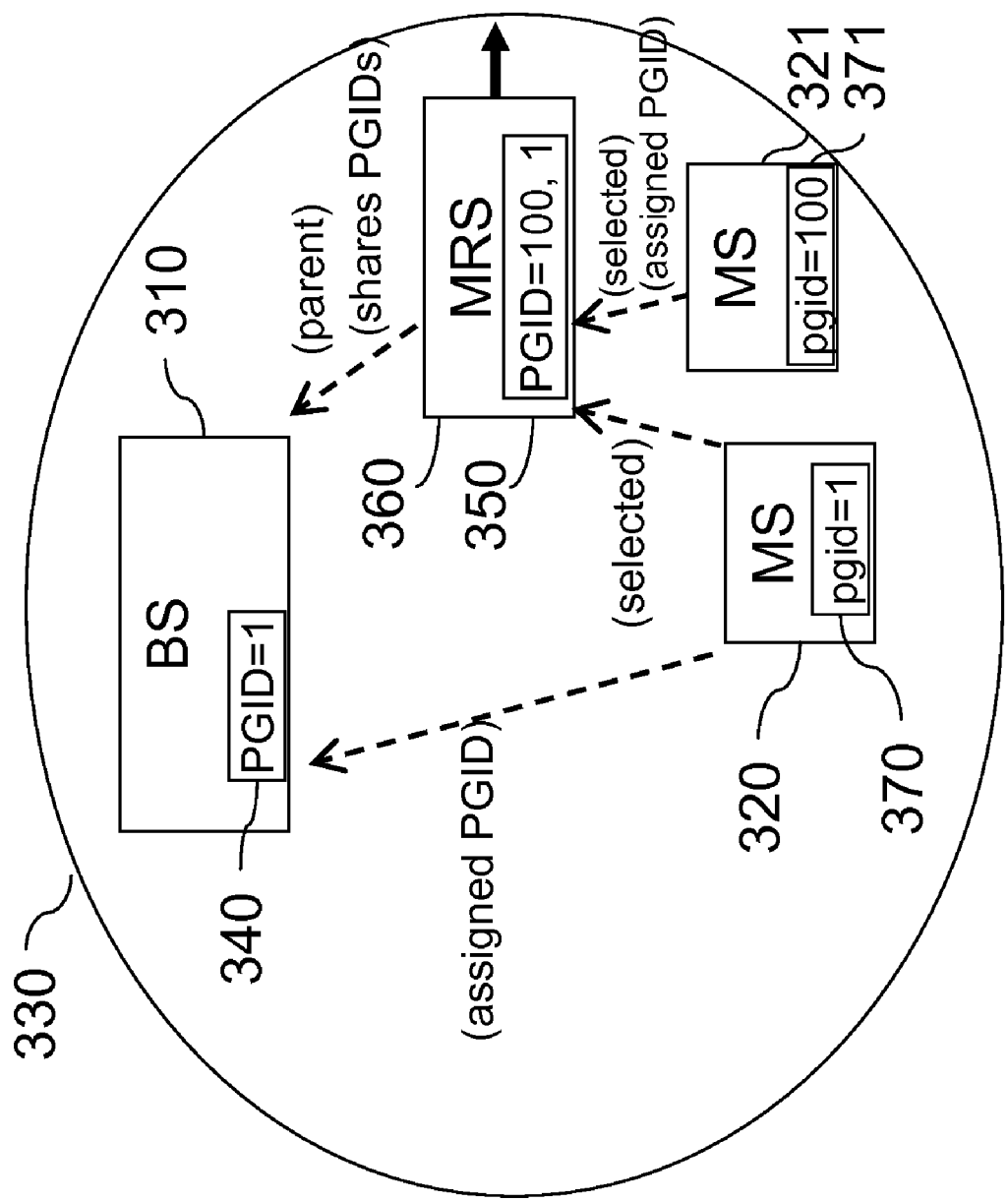

FIG. 3 illustrates that, consistent with known standards such as IEEE802.16e and for Mobile Relay networks in subgroup IEEE802.16j, when MRS 360 is near MS 320, MS 320's selection algorithm may select the MRS but the MS will not perform Location Update since the MRS supports its' PGID (=1).

Figure 4:
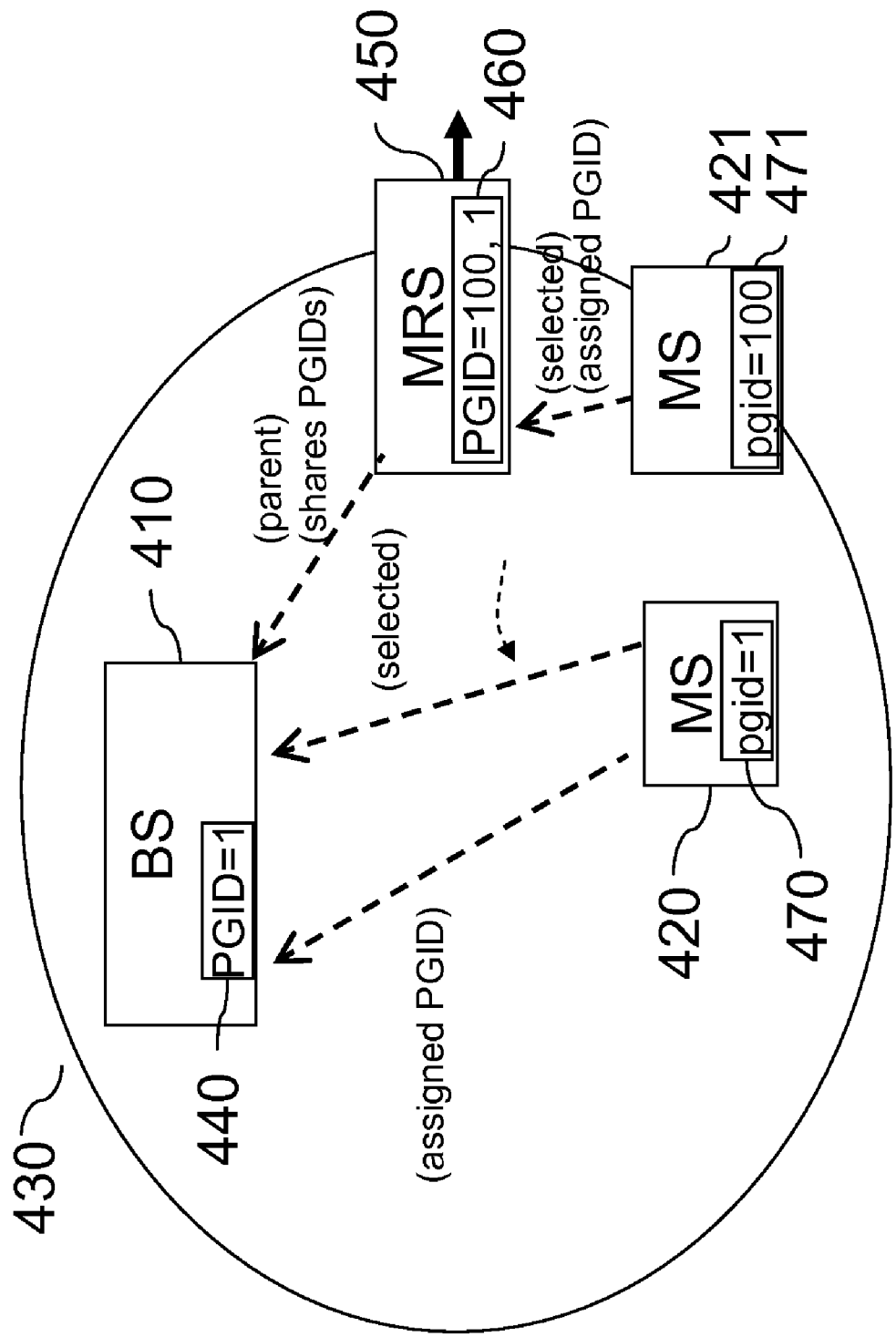

FIG. 4 illustrates the circumstance when, if MS 420 (which had previously selected MRS 450) is not joined with MRS 450 and MRS 450 moves away from MS 420, MS 420 may select BS 410 but will not perform Location Update since its PGID (=1) is supported by BS 410.

Figure 5:
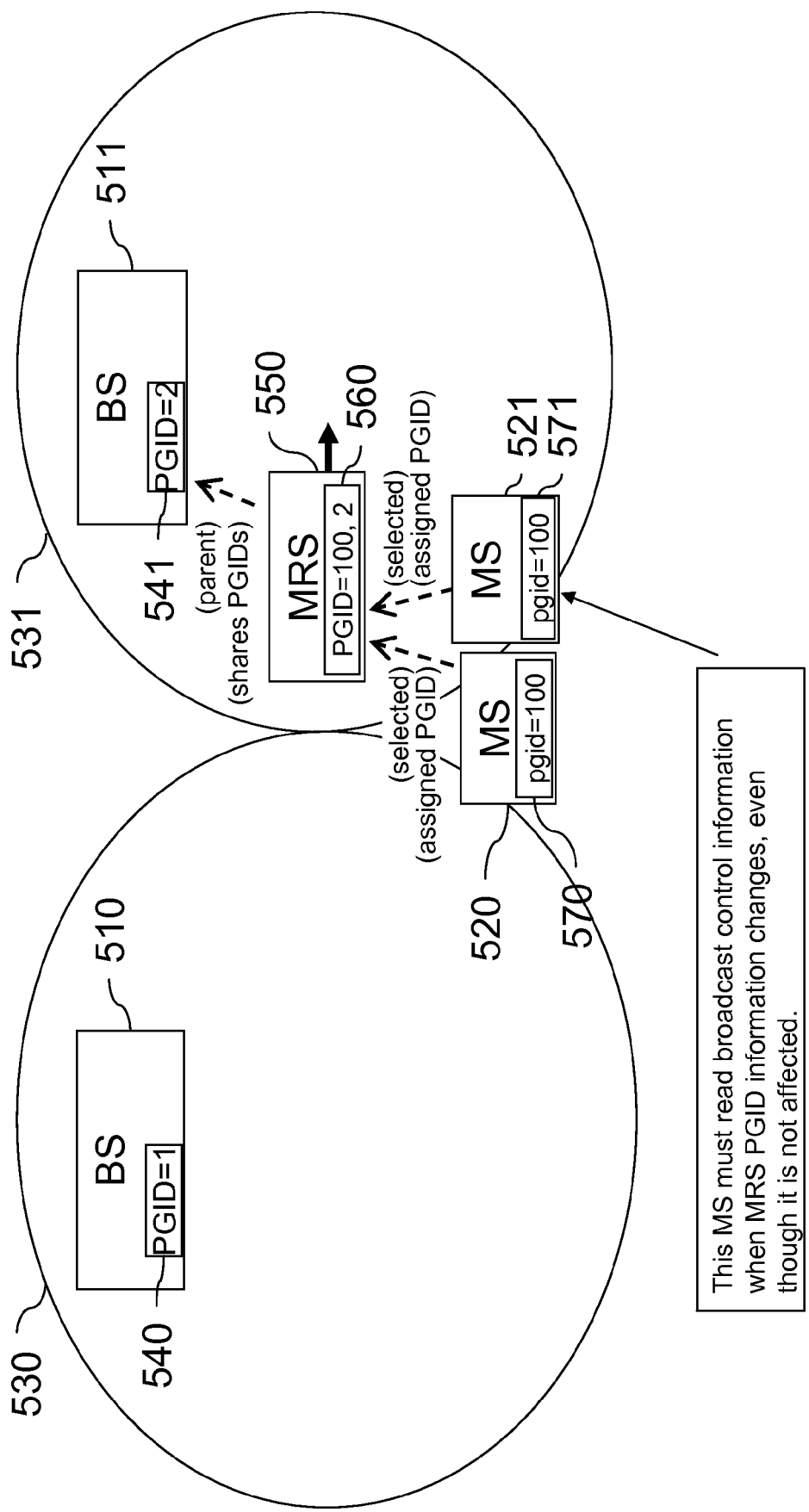
FIG. 5 illustrates two base stations and their corresponding coverage areas and includes an MRS that has handed over from one base station to the other and shows the relationships between the MSs, the BSs, and the MRS and the use of PGIDs.

FIG. 5 illustrates the circumstance when, if MS 520 is joined with MRS 550 and MRS 550 moves away from BS 510, MS 520 may perform Location Update when the MRS 550 hands off to another BS 511. This is because MRS 550 may begin to support BS 511's PGIDs and cease to support BS 510's PGIDs, so MS 520's PGID (=1) is no longer supported by MRS 550. This behavior may be realistic since a train traveling over a large area most likely would not support the Paging Groups for every BS in the area that it transverses. If it did, the network would deliver Paging Notifications for each of these BSs' PGIDs and MRSs would transmit all of these Paging Notifications over the air.

In this example, MS 520 is assigned MRS 550's PGID of 100 after MRS 550 hands over. In addition, the change in MRS 550's supported PGIDs will cause its broadcast configuration information to change, which must then be read by the MSs served by MRS 550, such as MS 521, even though this change does not affect these MSs since they have already been assigned MRS 550's PGID (=100). Reading the broadcast configuration information interrupts the sleep/idle cycle of the MSs which has a negative impact on battery power consumption.

According to one embodiment of the current invention, identifying a Paging Group as Primary, Secondary, or Ternary may be used to mitigate the impact of frequent changes in MRSs' and BSs' configuration information when they support each others' PGIDs in order to reduce the frequency of MS Location Updates when MRSs hand over into and out of a BS's coverage area. According to this embodiment, a Primary Paging Group for a particular BS/RS is a Paging Group that may be assigned to an MS when it selects that BS/RS. A Secondary Paging Group is a Paging Group that a particular BS/RS supports but an MS can not be assigned this Paging Group when it Selects that BS/RS. It is a Primary Paging Group for another BS/RS. A Ternary Paging Group for an MRS is a Paging Group that an MRS supports but it is a Primary Paging Group for another MRS. Multiple BSs may use the same Paging Group as a Primary Paging Group whereas only one MRS may use a particular Paging Group as a Primary Paging Group.

Once an MS is assigned a Primary PGID of an MRS, its location may be tracked by the network using the mobility events (handovers) of the MRS. Therefore, the Primary PGID of an MRS must be unique to that MRS. An MRS may support a BS's Primary Paging Group and advertise it as a Secondary Paging Group in its broadcast configuration information. An MRS may support an MRSs Primary Paging Group and advertise it as a Ternary Paging Group in its broadcast configuration information.

When an MS initially selects and joins an MRS, the MSs assigned Paging Group may be a Primary Paging Group of the BS whose service it just left. If the MRS supports this Paging Group as a Secondary Paging Group, the MS would not update its location. When the MRS hands over to a new BS, the MRS may support the new BS's Paging Groups as Secondary Paging Groups and the MRS may stop supporting the old BS's Paging Groups. The MRS would change its broadcast configuration information to reflect the change in the supported Secondary Paging Groups and the MS would perform location update because the MRS no longer supports its assigned Paging Group.

According to this embodiment of the invention, the MRS would only indicate that there has been a change in the Secondary Paging Groups in its broadcast configuration information. Accordingly, MSs already assigned a MRS Primary Paging Group would not be required to update their stored configuration information and may maintain their sleep/idle cycle, since they are not affected by a change in the Secondary Paging Groups. MSs assigned to a Secondary Paging Group would be required to update their stored configuration information, however, and if the MRS no longer supports their assigned Paging Group, they would perform Location Update.

Figure 6:
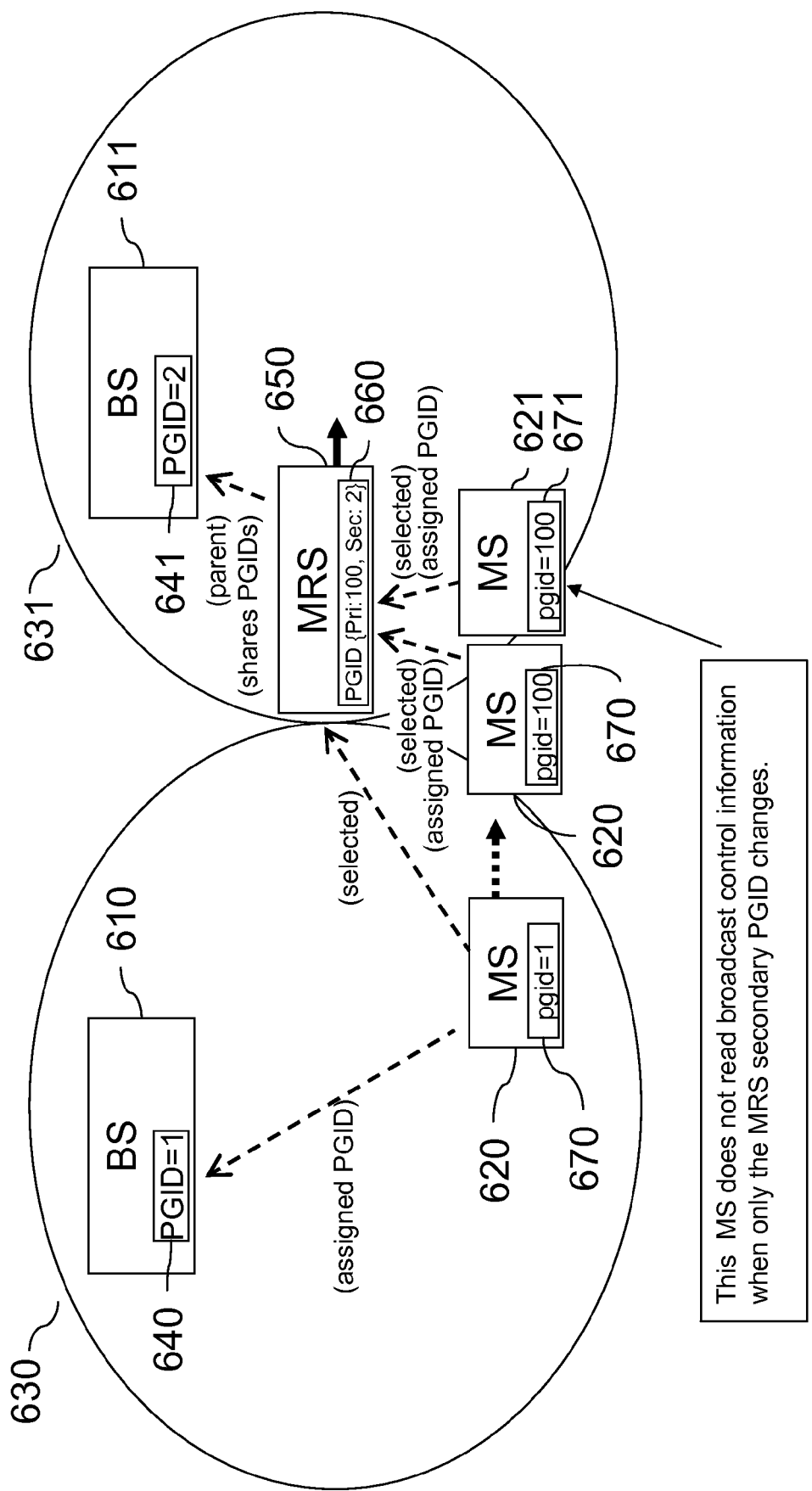
FIGS. 6-8 illustrate two base stations and their respective corresponding coverage areas according to a preferred embodiment of the invention where Primary, Secondary, and Ternary PGIDs are used and includes an MRS that has handed over from one base station to the other and shows the relationships between the MSs, the BSs, and the MRS and the use of PGIDs.

FIG. 6 illustrates this embodiment of the invention. The Paging Group record 660 of MRS 650 includes PGID 100 as the Primary Paging Group and PGID 2 as a Secondary Paging Group, which is BS 611's Paging Group. When MRS 650 hands over to BS 611 and stops supporting BS 610's PGIDs, it will indicate that only a change in the Secondary Paging Group has occurred. MS 620 (which formerly had PGID=1, which is not supported by BS 611) will perform Location Update and be assigned PGID 100. MS 621 (which has PGID=100, which continues to be supported by MRS 650) would not update its stored configuration information.

Primary/Secondary Paging Groups are beneficial for BS operation as well. When an MRS hands over to a new BS, the BS may then begin to support the MRS's Paging Groups so that Location Update is not required when an MS separates from an MRS and selects the BS. However, when the BS begins to support the MRS' PGIDs, its' broadcast configuration information would change. Without support for Primary and Secondary Paging Groups, this would cause all MSs served by the BS to update their stored configuration for this BS. If the BS instead advertises the MRS's Paging Group as a Secondary Paging Group, and it indicates that only the Secondary Paging Groups have changed, MSs assigned a Primary Paging Group of the BS would not update their stored configuration information.

One scenario where this may be beneficial is when an MS has joined an MRS, the MRS is near a BS, and the MS selects the BS. If the BS supports the MRS Paging Group and advertises it as a Secondary Paging Group, then the MS will not perform Location Update. Also, when an MS separates from an MRS and selects a BS, if the BS supports the MRS Paging Group and advertises it as a Secondary Paging Group, the MS will not need to perform a Location Update until the MRS hands off to another BS or the MS selects another BS/RS. With support for Secondary Paging Groups, the BS may indicate that only the Secondary Paging Groups have changed so only MSs assigned Secondary Paging Groups need to update their stored configuration information for this BS.

Figure 7:
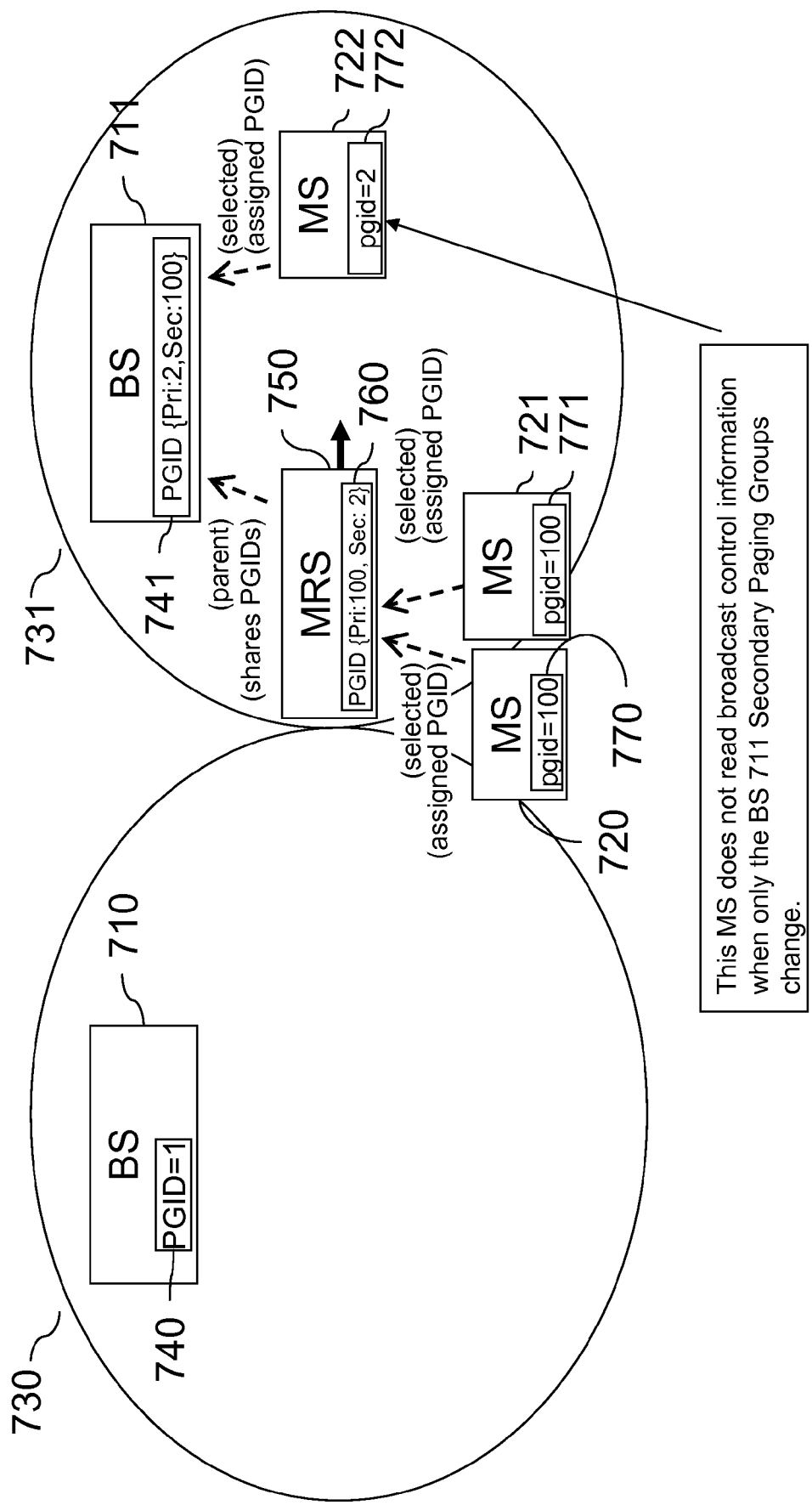

In FIG. 7, when MRS 750 hands over to BS 711 and BS 711 supports MRS 750's PGID as a Secondary Paging Group, BS 711 will indicate a change in its Secondary Paging Groups in its broadcast configuration information. MSs that have selected BS 711, such as MS 722, will not update their stored configuration information.

Figure 9:
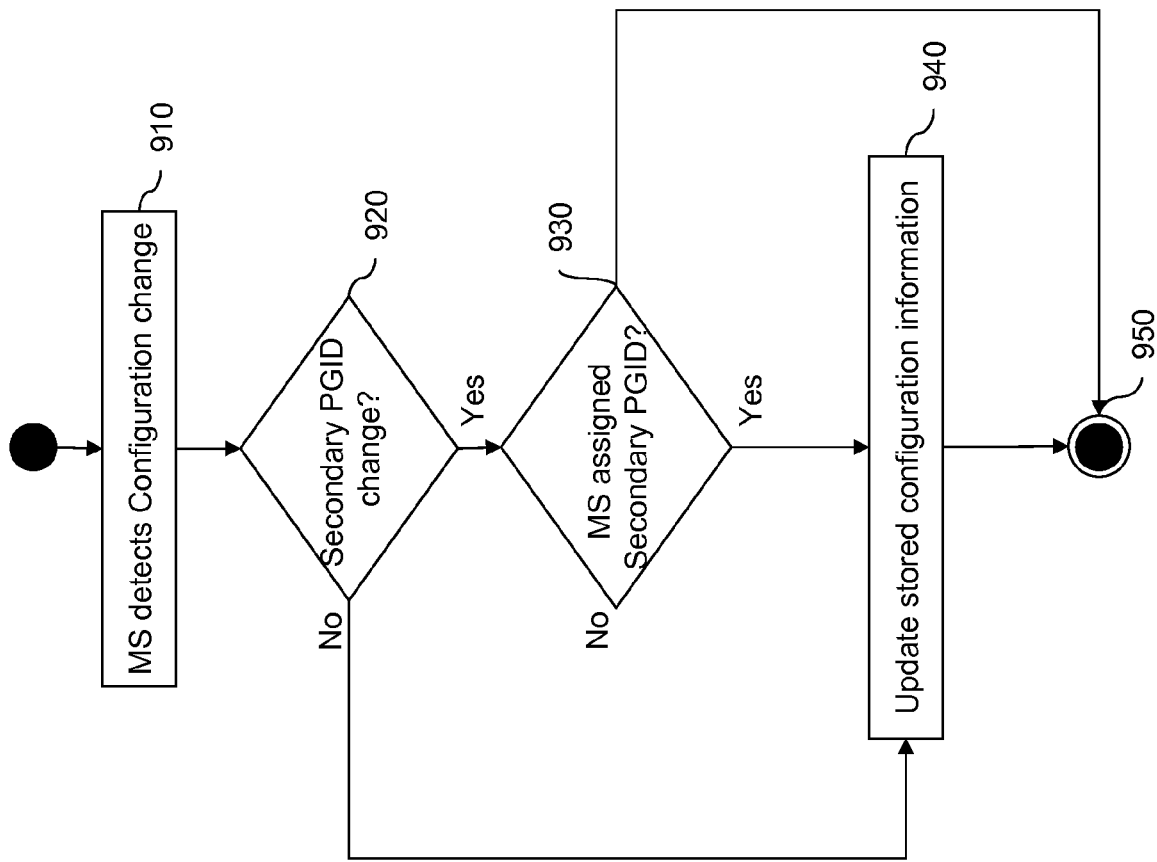
FIGS. 9-10 illustrate the control flow for the use of Secondary and Ternary PGIDs.

In FIG. 9, the flow control logic is shown for an MS when Primary and Secondary PGIDs are supported. In action 910, an MS detects that the configuration has changed for its' selected BS/RS. In action 920, if the Secondary PGID indicator is set, the MS proceeds to action 930. Otherwise, the MS proceeds to action 940. In action 940, the MS updates its stored configuration information for the BS/RS and then proceeds to action 950, which is the final state. In action 930, if the MS is assigned a Secondary PGID, the MS proceeds to action 940. Otherwise, the MS proceeds to action 950, which is the final state, so the MS does not update its stored configuration information for the BS/RS.

Another scenario where Primary and Secondary Paging Groups may be beneficial is when an MS separates from one MRS and soon after joins another MRS. When an MRS hands over to a new BS, it may support all Paging Groups that the BS supports, including both Primary and Secondary Paging Groups, and the BS may support the MRS's Paging Groups as Secondary PGIDs. Therefore, when two MRSs handover to a BS, the BS may support both MRSs' Paging Groups as Secondary Paging Groups, and, consequently, each MRS would obtain the other's Paging Groups from the BS. As a result, when an MS separates from one MRS and selects the BS, it would not need to update its location because the BS would be supporting the MRS's Paging Groups. If the MS then joins another MRS, the MS would not need to update its location because the new MRS would be supporting the old MRS's Paging Groups. Accordingly, a Ternary Paging Group for a particular MRS is defined as a Paging Group supported by that MRS that is a Primary Paging Group for another MRS. When an MRS leaves a cell, support for its PGIDs as Secondary and Ternary PGID ends. An additional indicator may be used in an MRS's broadcast configuration information when there is a change in the MRS's Ternary Paging Groups and only MSs assigned a Ternary Paging Group would update their stored configuration information for this MRS.

Figure 8:
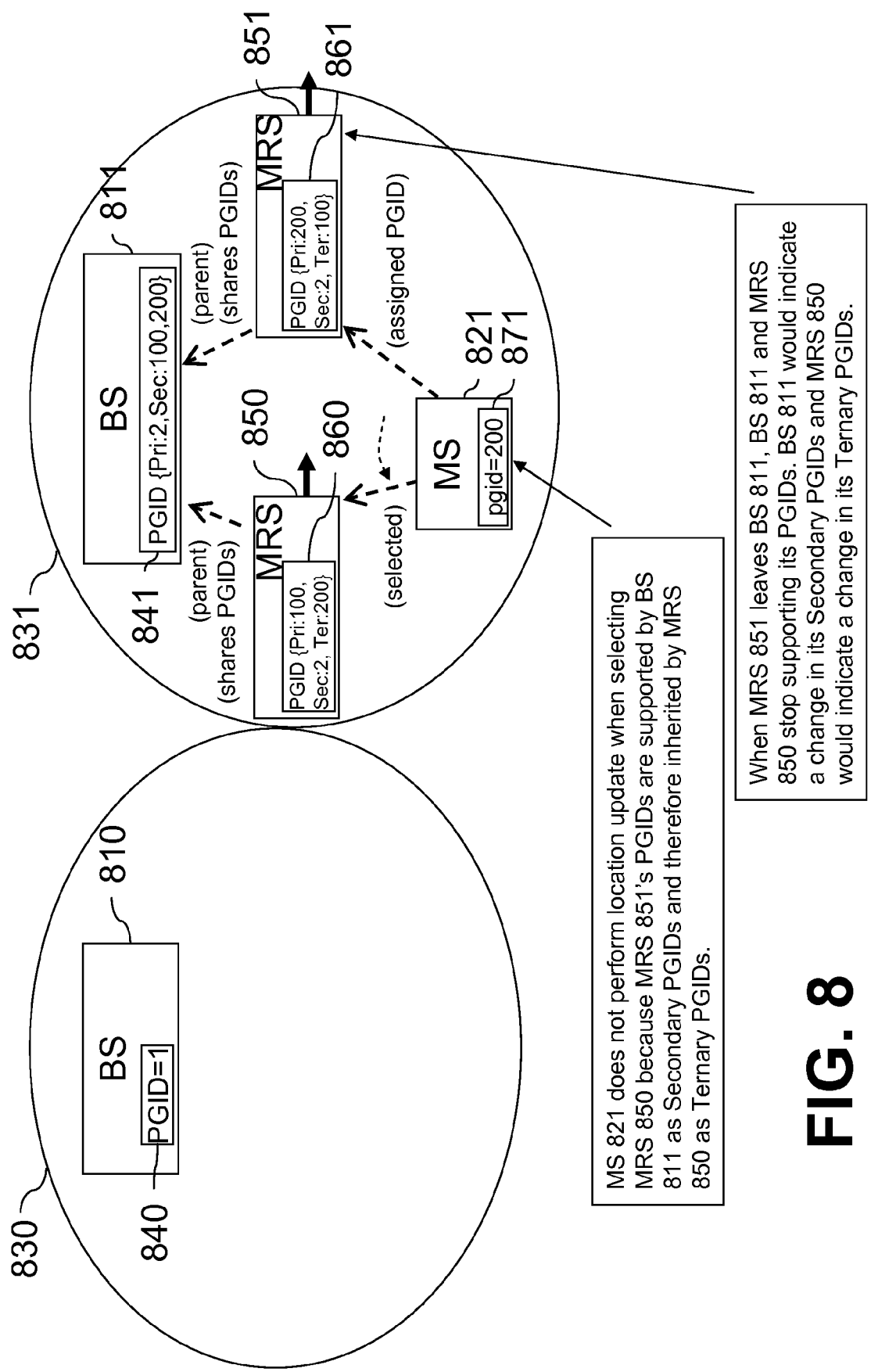

In FIG. 8, BS 811 serves MRSs 850 and 851. MRS 850's Primary PGID is 100 and MRS 851's Primary PGID is 200. BS 811 supports both MRS 850 and 851's PGIDs as Secondary PGIDs. MRS 850 supports MRS 851's PGID as a Ternary PGID and MRS 851 supports MRS 850's PGID as a Ternary PGID. According to this embodiment of the invention, MS 821 does not perform Location Update when selecting MRS 850 because MRS 851's PGIDs are supported by BS 811 as Secondary PGIDs and therefore inherited by MRS 850 as Ternary PGIDs. When MRS 851 leaves BS 811, BS 811 and MRS 850 stop supporting its PGIDs. BS 811 would indicate a change in its Secondary PGIDs and MRS 850 would indicate a change in its Ternary PGIDs.

Figure 10:
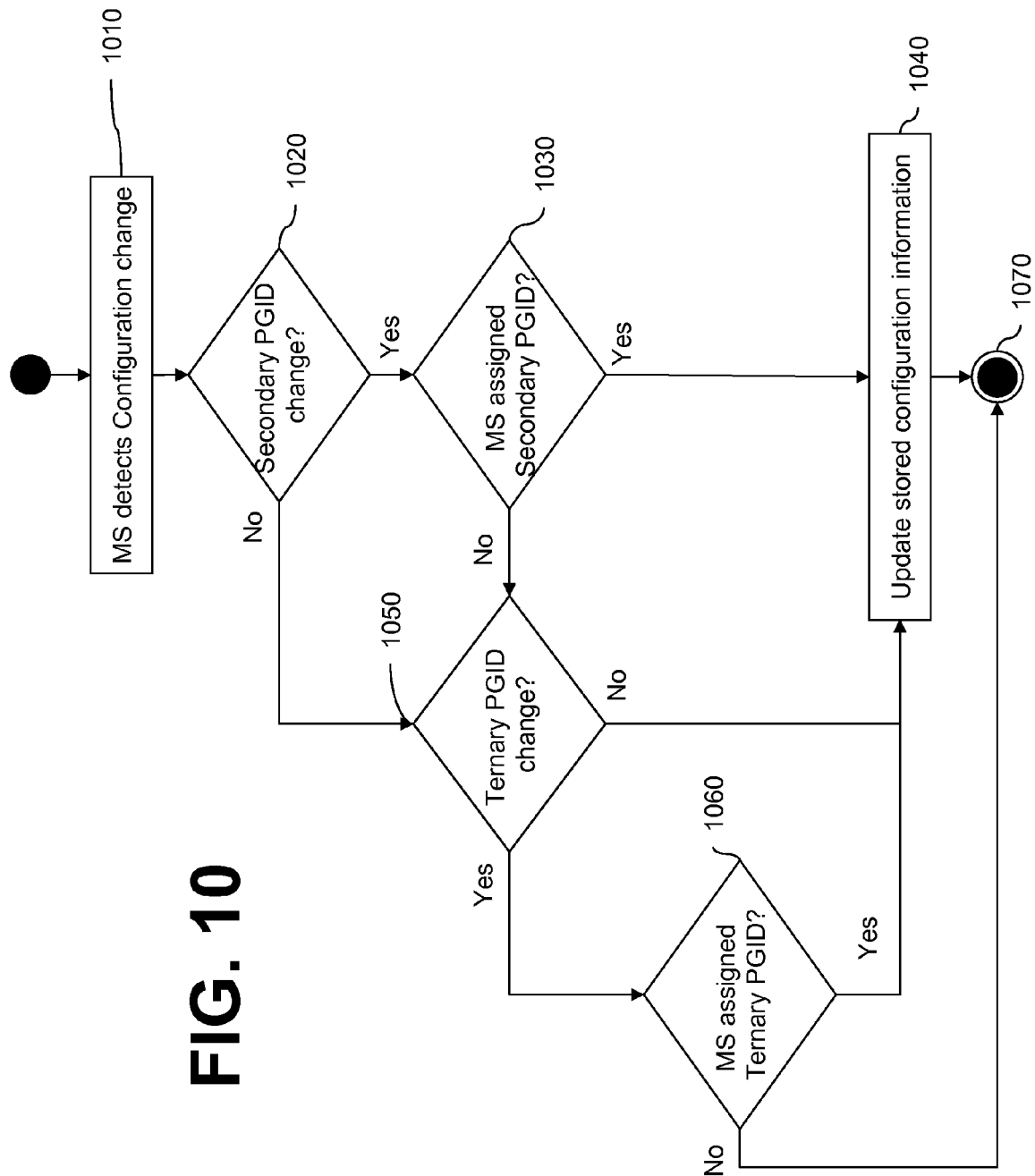

In FIG. 10, the flow control logic is shown for an MS when Primary, Secondary, and Ternary PGIDs are supported. In action 1010, an MS detects that the configuration has changed for its' selected BS/RS and proceeds to action 1020. In action 1020, if the Secondary PGID indicator is set, the MS proceeds to action 1030. Otherwise, the MS proceeds to action 1050. In action 1030, if the MS is assigned a Secondary PGID, the MS proceeds to action 1040. In action 1040, the MS updates its stored configuration information for the BS/RS and proceeds to the final state. In action 1030, if the MS is not assigned a Secondary PGID, the MS proceeds to action 1050. In action 1050, if the Ternary PGID indicator is set, the MS proceeds to action 1060. Otherwise, the MS proceeds to action 1040. In action 1040, the MS updates its stored configuration information for the BS/RS and proceeds to the final state, action 1070. In action 1060, if the MS is assigned a Ternary PGID, the MS proceeds to action 1040. Otherwise, the MS proceeds to action 1070, the final state, and the stored configuration information is not updated.

An MRS may obtain the BS's Paging Groups from broadcast, multicast, or unicast messages the BS transmits and the MRS may then advertise them as Secondary or Ternary Paging Groups. Since an RS is subordinate to a BS, the network does not need to be notified when the RS joins the BS's Paging Groups. It is enough for the BS to know an RS has joined a Paging Group. The network will deliver Paging Notifications associated with a Paging Group to the BS and the BS may then distribute them to its subordinate RSs that belong to this Paging Group.

According to another embodiment of the invention, the Location Update procedure is made more efficient when MRSs are deployed in a network by providing the means to deter an MS from selecting an MRS unless the MS has joined the MRS. In this way, other techniques for avoiding MS Location Updates, such as MRSs supporting BSs Paging Groups, etc. as discussed in the previous embodiment, may not be necessary since they are applicable when an MS has selected an MRS without joining the MRS. Once an MS joins a MRS, it should perform Location Update at some time in order to be assigned a Paging Group of the MRS. In the previous embodiment, this occurred when the MRS handed over to a new BS. According to this embodiment of the invention, the MS's movement relative to the MRS is used to determine whether the MS has joined the MRS, and if it has, it will select the MRS, or, if it has already selected the MRS, it will perform Location Update.

According to this embodiment, MSs are provided an indication that an RS is a Mobile RS. This may be provided in the MRS's broadcast configuration information or in the neighbor information. There are 3 alternatives for this embodiment, depending on implementation preferences: MS unassisted: the MS determines whether the MRS is moving before considering selecting it. MRS assisted: the MRS assists the MS by indicating whether or not it is moving. BS assisted: the parent BS assists the MS by indicating whether or not the MRS is moving. An MS, MRS, and BS may determine motion relative to each other using path loss or Doppler measurements, for example. The MS may determine its motion relative to the MRS and BS in this way and the MRS may determine its motion relative to the BS. The MRS may report information to the BS for it to determine the state of its movement.

According to the MS unassisted method, initially, the MS uses the local BS as its selected BS. The MRS moves near the MS and the MS determines it is the best selection. Since it is a Mobile RS, if the MS determines that neither the MRS nor the BS are moving relative to itself, it does not select the MRS, since it is not known whether the MS has joined the MRS. An alternative is that the MS does select the MRS but does not perform Location Update. For this alternative, the MS must have the ability to continue to monitor page notifications from the BS, since the MRS does not support its Paging Group. This requires enhanced functionality where the MS is effectively operating with 2 selected BS/RSs.

If the MS determines that the MRS is not moving relative to itself and it is moving relative to the BS, it selects the MRS and performs Location Update, since it is known that the MS has joined the MRS. For the alternate case, where the MS has already selected the MRS, the MS would perform Location Update at this time and stop monitoring the BS. When the MS determines another BS for selection, it should not select it if neither the MRS nor the new BS is moving relative to itself. Otherwise, the MS determines its movement relative to the MRS and the new BS, and selects the one that is not moving relative to itself.

Figure 11:
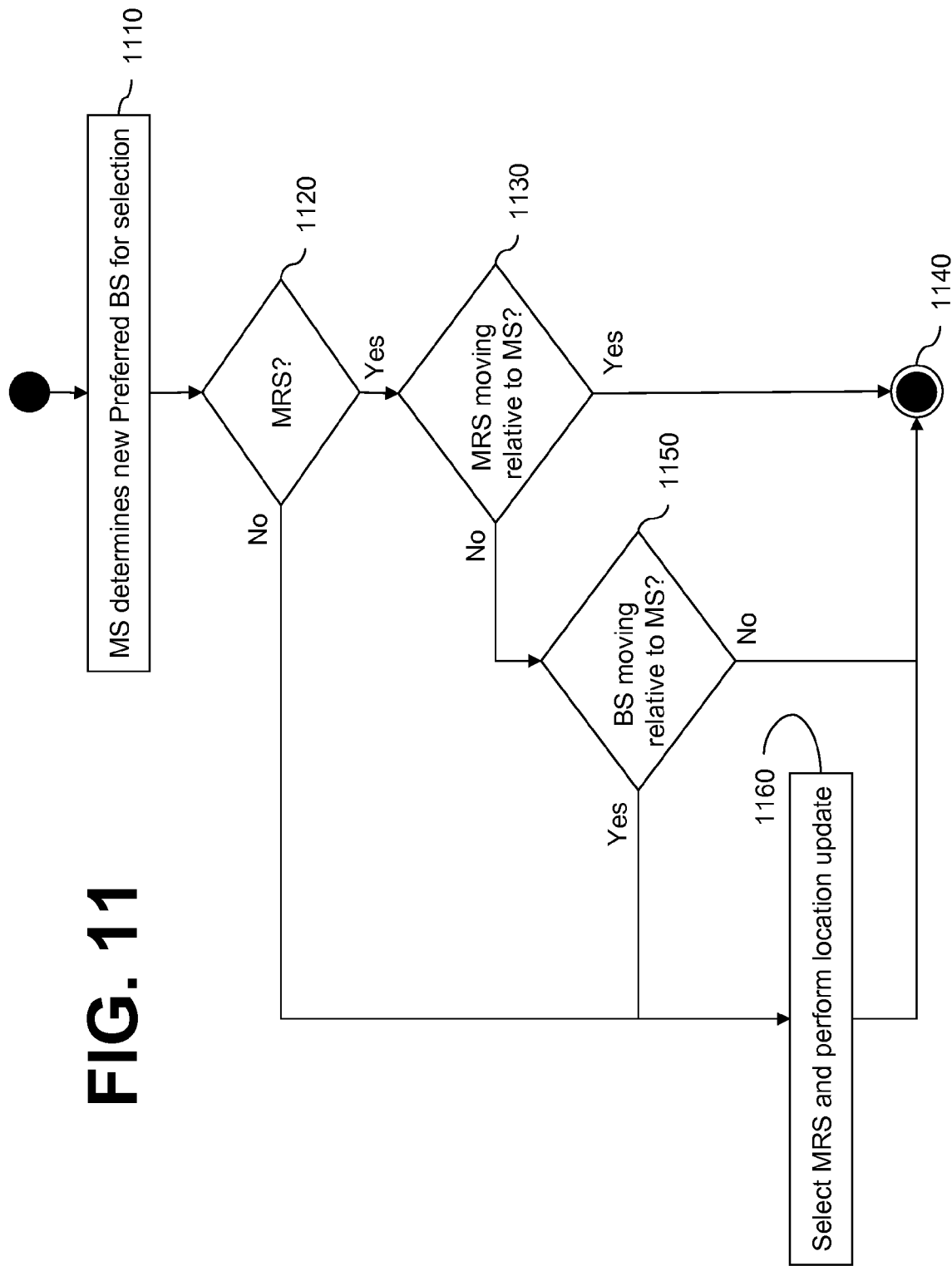
FIGS. 11-13 illustrate the control flow for the selection of a MRS according to an embodiment of the invention.

In FIG. 11, in action 1110, the MS determines a new BS/RS for selection and proceeds to action 1120. In action 1120, if the new station is an MRS, the MS proceeds to action 1130. Otherwise, the MS proceeds to action 1160. In action 1160, the MS selects the new BS/RS and performs Location Update. In action 1130, if the MS determines that the MRS is not moving relative to itself, it proceeds to action 1150. Otherwise, if the MS determines that the MRS is moving relative to itself, it proceeds to action 1140, which is the final state, and does not select the new BS/RS. In action 1150, if the MS determines that the BS is moving relative to itself, it proceeds to action 1160. Otherwise, if the MS determines that the BS is not moving relative to itself, it proceeds to action 1140.

With the MRS assisted method, the MRS assists the MS by providing an indicator of its movement state. As a result, the MS does not need to determine whether the MRS is moving. The MRS determines whether it is moving and includes this information in an indicator in its broadcast configuration information or other signaling means. The MS detects an MRS, receives an indication that it is a Mobile RS, and determines it is the best selection. If the MRS indicates that it is not moving, the MS will not select the MRS. An alternative is that the MS does select the MRS but does not perform location update. For this alternative, the MS must have the ability to continue to monitor page notifications from the BS, since the MRS is not supporting its Paging Group. This requires enhanced functionality where the MS is operating with 2 selected BS/RSs.

If the MRS indicates that it is moving and the MS determines that it is not moving relative to the MRS, the MS selects the MRS and performs location update. For the alternative case, where the MS has already selected the MRS, the MS would perform location update at this time and stop monitoring the BS. When the MS determines another BS to select, it should not select it if the MRS indicates that it is not moving. Otherwise, the MS determines its movement relative to the MRS, and selects the BS if the MS is moving relative to the MRS.

Figure 12:
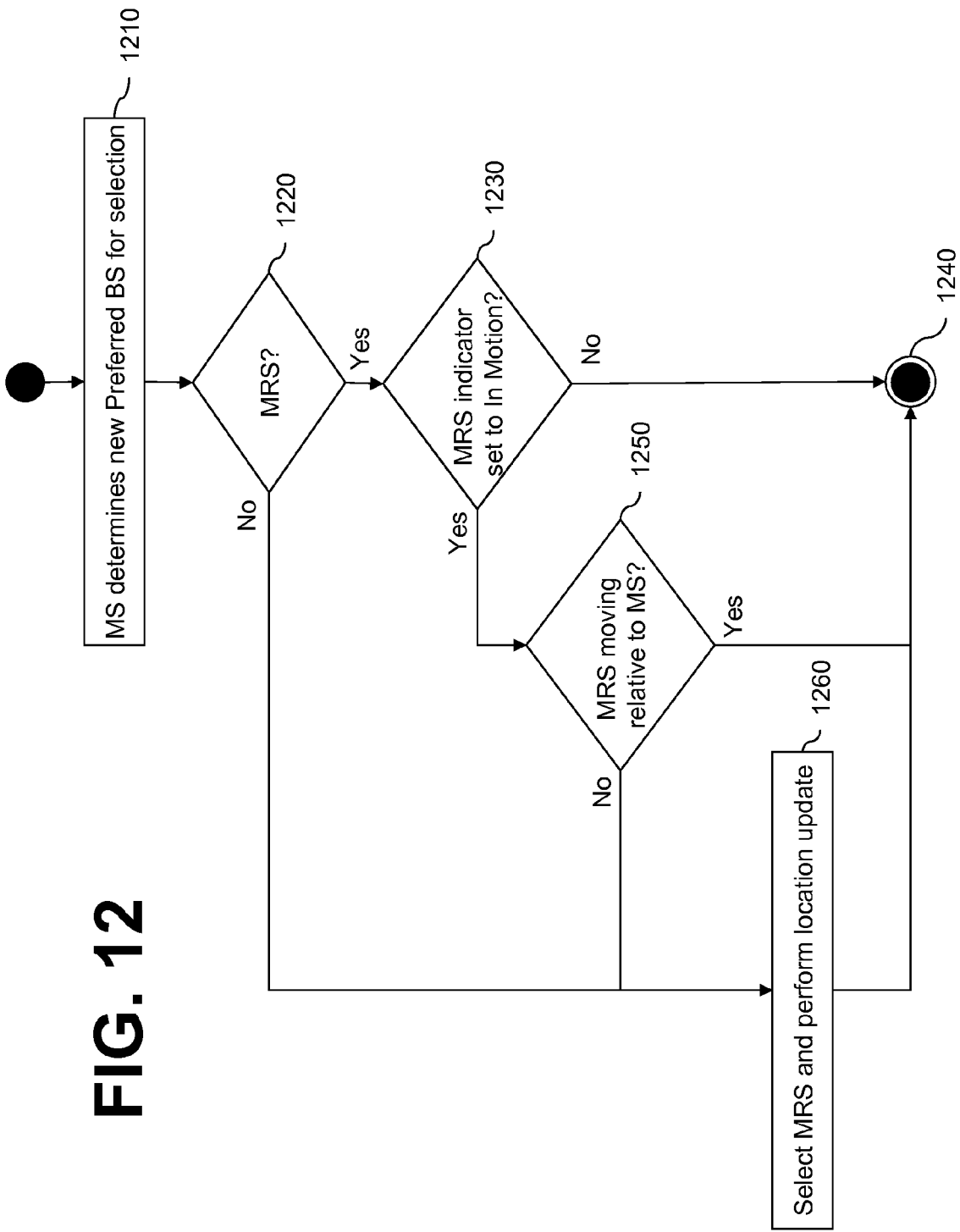

In FIG. 12, in action 1210, the MS determines a new BS/RS for selection and proceeds to action 1220. In action 1220, if the new station is an MRS, the MS proceeds to action 1230.

Otherwise, the MS proceeds to action 1260. In action 1260, the MS selects the new BS/RS and performs Location Update and then proceeds to action 1240, the final state. In action 1230, if the MRS motion indicator is set to IN MOTION, the MS proceeds to action 1250. Otherwise, if the MRS motion indicator is not set to IN MOTION, the MS proceeds to action 1240, the final state, and does not select the new BS/RS. In action 1250, if the MS determines that the MRS is not moving relative to itself, it proceeds to action 1260. Otherwise, if the MS determines that the MRS is moving relative to itself, it proceeds to action 1240, the final state, and does not select the new BS/RS.

With the BS Assisted method, BS assists the MS by providing an indicator of the MRS's movement state. As a result, the MS does not need to determine whether the MRS is moving. The BS determines whether the MRS is moving and includes this information in an MAC management message so the MS does not need to determine this on its own. The BS may include this information in MOB_-NBR-ADV in a neighbor record for the MRS and may send this message every Paging Listening Interval. The MS detects an MRS, receives an indication that it is a Mobile RS, and determines it is the best selection. If the BS indicates that the MRS is not moving, the MS will not select the MRS.

An alternative is that the MS does select the MRS but does not perform location update. For this alternative, the MS must have the ability to continue to monitor page notifications from the BS, since the MRS is not supporting its Paging Group. This requires enhanced functionality where the MS is operating with 2 selected BS/RSs. If the BS indicates that the MRS is moving and the MS determines that it is not moving relative to the MRS, the MS selects the MRS and performs location update. For the alternative case, where the MS has already selected the MRS, the MS would perform location update at this time and stop monitoring the BS. When the MS determines another BS to select, it should not select it if the parent BS or MRS indicates that the MRS is not moving. Otherwise, the MS determines its movement relative to the MRS, and selects the BS if the MS is moving relative to the MRS.

Figure 13:
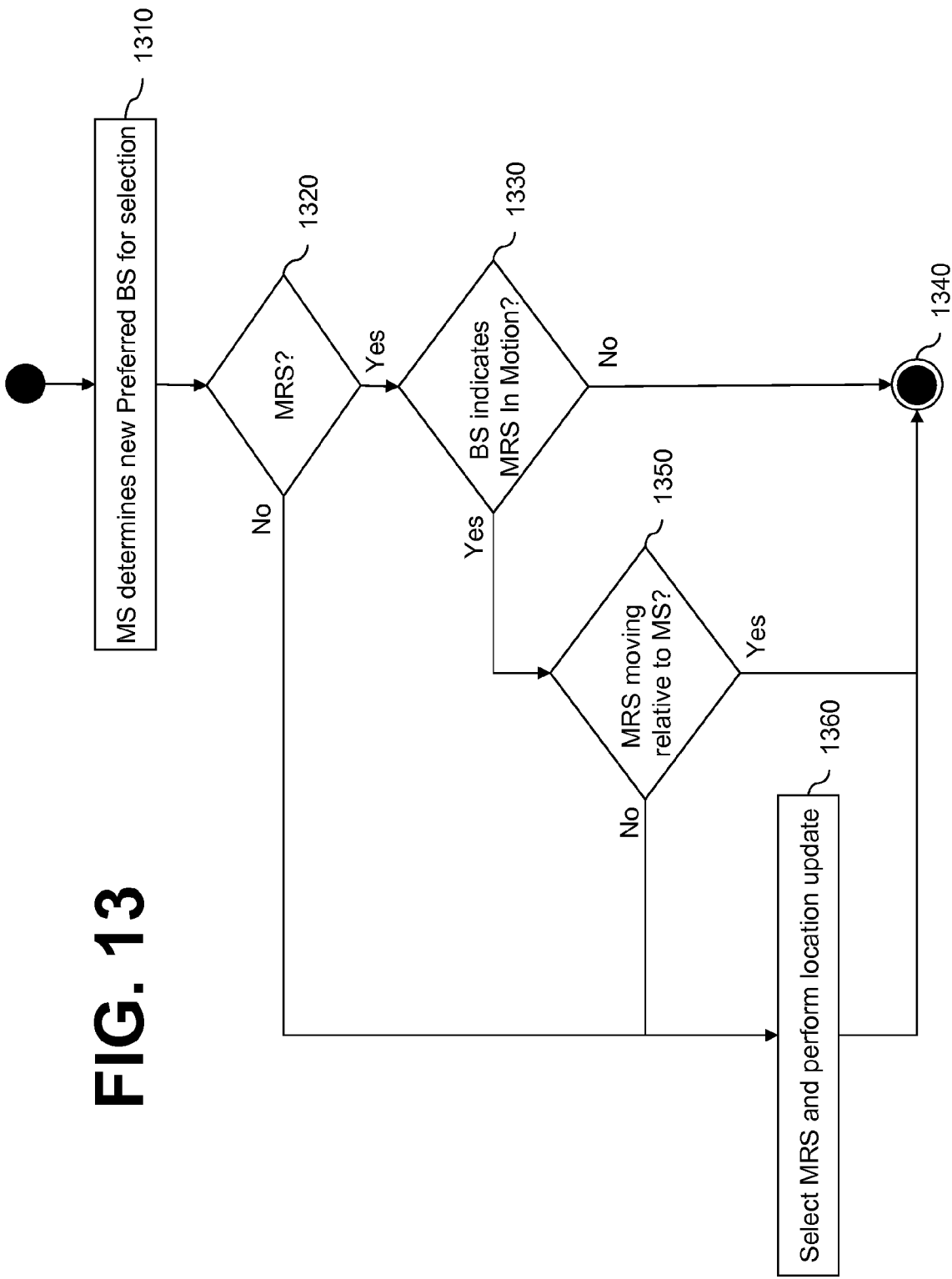

In FIG. 13, in action 1310, the MS determines a new BS/RS for selection and proceeds to action 1320. In action 1320, if the new station is an MRS, the MS proceeds to action 1330. Otherwise, the MS proceeds to action 1360. In action 1360, the MS selects the new BS/RS and performs location update and then proceeds to action 1340, the final state. In action 1330, if the BS indicates that the MRS is IN MOTION, the MS proceeds to action 1350. Otherwise, if the BS indicates that the MRS is not IN MOTION, the MS proceeds to action 1340, the final state, and does not select the new BS/RS. In action 1350, if the MS determines that the MRS is not moving relative to itself, it proceeds to action 1360. Otherwise, if the MS determines that the MRS is moving relative to itself, it proceeds to action 1340, the final state, and does not select the new BS/RS.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating within a wireless network, the wireless network including mobile relay stations (MRSs), the method comprising:

assigning to each MRS concurrent primary, secondary and ternary paging group identification values (PGIDs), wherein each respective primary PGID is unique to each respective MRS within a coverage area of a base station, wherein each respective secondary PGID corresponds to a primary PGID of the base station, and wherein each respective ternary PGID corresponds to a respective primary PGID of another MRS within the coverage area of the base station; and receiving a location update signal from a mobile station that selects the MRS only when the mobile station has stored therein PGID values that do not correspond to any one of the primary, secondary, or ternary PGIDs.

2. A method of operating a communications network comprising:

assigning to a base station in the communications network a base station primary paging group identification;

assigning to a mobile relay station within a coverage area of a base station (i) a mobile relay station secondary paging group identification, wherein the mobile relay station secondary paging group identification is the base station primary paging group identification, and (ii) a mobile relay primary paging group identification;

determining whether a mobile station is within a coverage area of the mobile relay station;

determining whether the mobile station is moving relative to the mobile relay station; and joining the mobile station to the mobile relay station when the mobile station is not moving relative to the mobile relay station and it is determined that the mobile station and/or the mobile relay station are moving relative to the base station.

3. The method of claim 2, wherein determining whether the mobile station is moving relative to the mobile relay station comprises the mobile station determining relative movement unassisted by the mobile relay station.

4. The method of claim 2, wherein determining whether the mobile station is moving relative to the mobile relay station is accomplished at least in part by an indication from the mobile relay station that the mobile relay station is in motion.

5. The method of claim 4, further comprising receiving the indication from the mobile relay station at the mobile station.

6. The method of claim 4, further comprising transmitting the indication from the mobile relay station.

7. The method of claim 2, wherein determining whether the mobile station is moving relative to the mobile relay station comprises an indication from the base station when the mobile relay station is in motion.

8. The method of claim 7, wherein determining whether the mobile station is moving relative to the mobile relay station comprises receiving the indication from the base station at the mobile station.

9. A method for communicating in a wireless communications network, the method comprising:

assigning to a base station (BS) in a communications network a base station primary paging group identification (BS Primary PGID);

assigning to a mobile relay station (MRS) within a coverage area of the BS (i) a mobile relay station secondary paging group identification (MRS secondary PGID), wherein the MRS secondary PGID is the BS primary PGID, and (ii) an MRS primary paging group identification (MRS primary PGID);

storing in a mobile station (MS) within a coverage area of the MRS a paging group identification selected from one of said MRS primary PGID and said MRS secondary PGID, when the MS selects the MRS; and sending an update location signal from the MS when the MS selects a second MRS or a second BS, which second MRS or second BS does not support the paging group identification stored in the MS;

deterring sending an update location signal from the MS when the MS selects a second MRS or a second BS, which second MRS or second BS does support the paging group identification stored in the MS.

10. A communication system comprising:

a first base station having associated therewith a coverage area and having stored therein a base station primary paging identification;

a first mobile relay station within the coverage area and having stored therein (a) a first mobile relay station primary paging identification, the first mobile relay station primary paging identification number being unique to all mobile relay stations within the coverage area of the base, (b) a first mobile relay station secondary paging identification, the first mobile relay station secondary paging identification being equivalent to the base station primary paging identification, and (c) a first mobile relay station ternary paging identification, the first mobile relay station ternary paging identification being equivalent to a second mobile relay station secondary paging identification; and a second mobile relay station in the coverage area and having stored therein (a) a second mobile relay station primary paging identification, the second mobile relay station primary paging identification number being unique to all mobile relay stations within the coverage are of the base, (b) a second mobile relay station secondary paging identification, the second mobile relay station secondary paging identification being equivalent to the base station primary paging identification, and (c) a second mobile relay station ternary paging identification, the second mobile relay station ternary paging identification being equivalent to the first mobile relay station secondary paging identification;

wherein a mobile station within the coverage area has stored therein a mobile station primary paging identification, the mobile station primary paging identification being equivalent to at least one of said base station primary paging identification, said first or second mobile relay station primary paging identification, or said first or second mobile relay station secondary paging identification.

11. The communication system of claim 10, further comprising the mobile station.

12. A wireless communications network comprising:
a base station; and
a plurality of mobile relay stations, wherein each mobile relay station within an area of coverage for the base station has associated with it a unique paging group identification value as well as the paging group identification value of the base station.

13. The wireless communications network of claim 12, wherein each mobile relay station within the area of coverage of the base station also has associated with it the unique paging group identification value for every other mobile relay station within the area of coverage of the base station.

14. The wireless communications network of claim 12, wherein the plurality of mobile relay stations comprises:

a first mobile relay station within the coverage area and having stored therein (a) a first mobile relay station primary paging identification, the first mobile relay station primary paging identification number being unique to all mobile relay stations within the coverage area of the base, (b) a first mobile relay station secondary paging identification, the first mobile relay station secondary paging identification being equivalent to the base station primary paging identification, and (c) a first ternary mobile relay station paging identification, the first ternary mobile relay station being equivalent to a second mobile relay station secondary paging identification; and a second mobile relay station in the coverage area and having stored therein (a) a second mobile relay station primary paging identification, the second mobile relay station primary paging identification number being unique to all mobile relay stations within the coverage are of the base, (b) a second mobile relay station secondary paging identification, the second mobile relay station secondary paging identification being equivalent to the base station primary paging identification, and (c) a second ternary mobile relay station paging identification, the second ternary mobile relay station being equivalent to the first mobile relay station secondary paging identification.

15. The wireless communications network of claim 14, wherein a mobile station within the coverage area has stored therein a mobile station primary paging identification, the mobile station primary paging identification being equivalent to at least one of said base station primary paging identification, said first or second mobile relay station primary paging identification, or said first or second mobile relay station secondary paging identification.

* * * * *